United States Patent
Suresh et al.

(10) Patent No.: US 12,466,986 B2
(45) Date of Patent: Nov. 11, 2025

(54) METHOD OF ALTERING THE WETTABILITY OF A SUBTERRANEAN SURFACE TO ENHANCE PROTECTION OF HYDROCARBONS

(71) Applicant: Baker Hughes Oilfield Operations LLC, Houston, TX (US)

(72) Inventors: Radhika Suresh, Sugar Land, TX (US); Naima Bestaoui-Spurr, The Woodlands, TX (US); Kimberly Spurlock-Lant, Conroe, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 19/015,320

(22) Filed: Jan. 9, 2025

(65) Prior Publication Data

US 2025/0145878 A1    May 8, 2025

Related U.S. Application Data

(62) Division of application No. 18/198,116, filed on May 16, 2023, now Pat. No. 12,234,406.

(51) Int. Cl.
   *C09K 8/506*   (2006.01)
   *E21B 43/16*   (2006.01)

(52) U.S. Cl.
   CPC .............. *C09K 8/506* (2013.01); *E21B 43/16* (2013.01); *C09K 2208/10* (2013.01)

(58) Field of Classification Search
   CPC ....................................................... C09K 8/60
   See application file for complete search history.

(56) References Cited

U.S. PATENT DOCUMENTS

2015/0083417 A1* 3/2015 Lant .................. C09K 8/60
                                                                 166/279

* cited by examiner

*Primary Examiner* — William D Hutton, Jr.
*Assistant Examiner* — Avi T Skaist

(57) ABSTRACT

A method of imparting hydrophobicity and/or oleophobicity to a surface of a subterranean formation penetrated by a well during production of hydrocarbons from the well consists of pumping a surface modifying wettability agent into the well, the surface modifying wettability agent having an anchor, one or more hydrophobic and/or oleophobic functional groups attached to the anchor and one or more alkoxy groups as blocking moieties which increase stability of the agent in the presence of water by slowing down hydrolysis at the formation surface.

19 Claims, 10 Drawing Sheets

B = blocking agent that reduces/slows down the reactivity of the Z-O group
Z = transition metal (Si, etc.)
Y = Si group from the reservoir Etched Glass Slide CA: 20°

(A)

(B)

(C)

Etched Glass Slide CA: 20°

(A)

Polymer coating CA: 103°

(B)

Day 9

Day 7

Day 5

Day 3

Before ← Sonication → After

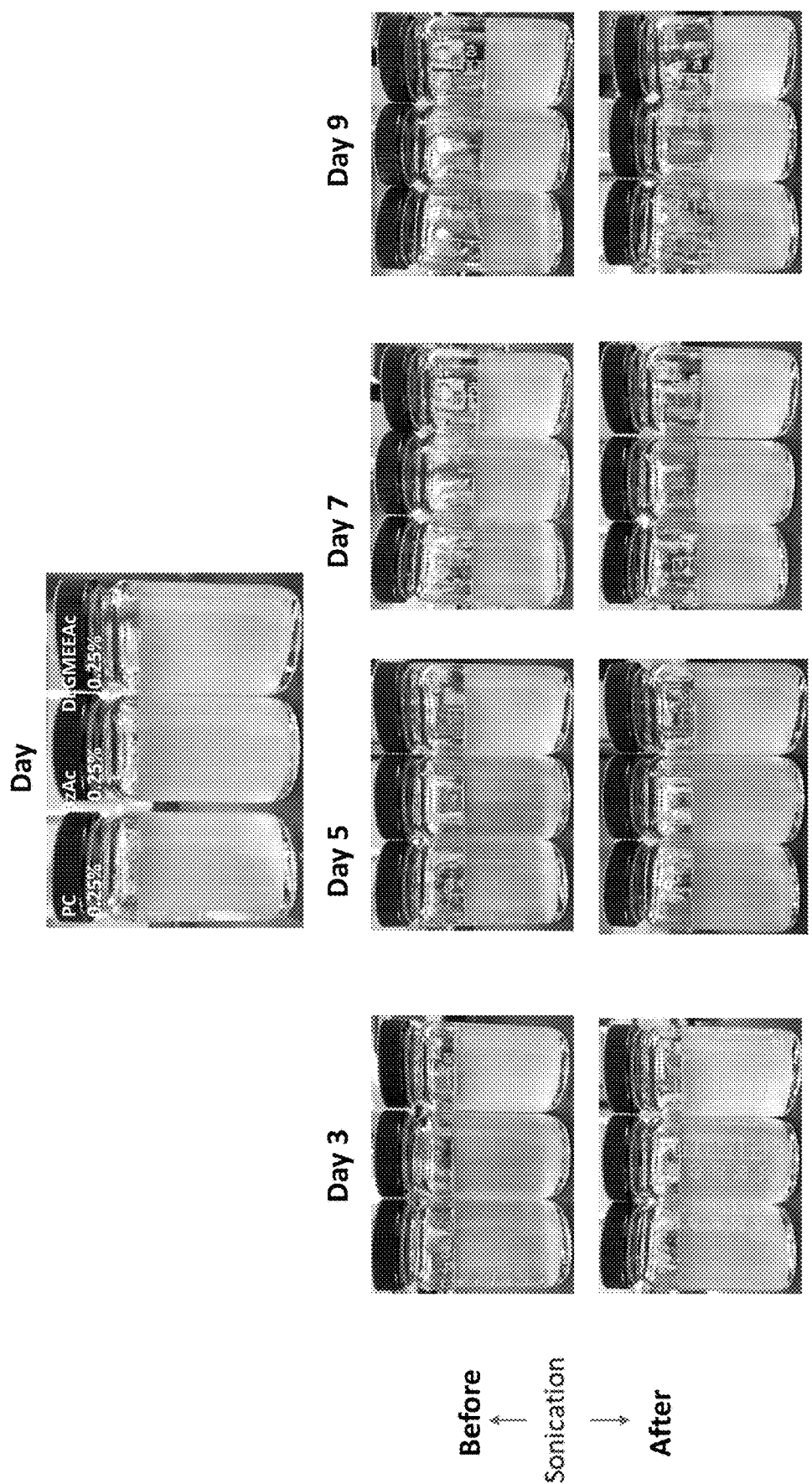

US 12,466,986 B2

METHOD OF ALTERING THE WETTABILITY OF A SUBTERRANEAN SURFACE TO ENHANCE PROTECTION OF HYDROCARBONS

FIELD

The disclosure relates to methods of enhancing production of hydrocarbons from a subterranean formation by altering the wettability of the surface of the formation with hydrophobically and/or oleophobically surface modifying wettability agents.

BACKGROUND

During the life of an oil or gas well, wetting properties of surfaces of the subterranean formation may be altered dramatically as water saturation of surfaces change. An excessive amount of water-wetness of the surface of the formation reduces permeability of the formation and adversely affects the amount of oil and/or gas that may be ultimately recovered from the well as the water takes the place of recoverable hydrocarbons. In addition to adversely affecting hydrocarbon production, excessive water wetness increases the cost of hydrocarbon production.

Increased water saturation is of particular concern in sandstone formations where water saturation can narrow pore throats restricting hydrocarbon flow and decreasing hydrocarbon production. Formations rich in swellable and migrating clays are also water sensitive due to the presence of kaolinite, chlorite, illite and mixed layers of illite and smectite. Water retention issues may be especially acute in tight gas formations. When exposed to aqueous based fluids, such water-wet formations trap water for extended periods, if not permanently. This is especially the case in the near-wellbore region of the well.

In the past, keeping the surface of the formation at an appropriate water-wet state to improve movement of hydrocarbons has required pumping of a strong water-wet surfactant, optionally with a solvent. The surfactant is then adsorbed onto the surfaces reducing the capillary pressure and water saturation within the porous systems. This is, however, not a permanent solution, as the surfactant is desorbed and washed out over time.

More recently, alkoxy silanes have been evaluated for altering wettability. However, the alkoxy groups tend to hydrolyze and form crosslinked polymers. Such polymers are known to precipitate. Similar reactions have been noted when silane chemistry is used in conjunction with nanoparticles. The instability of such materials lowers their effect on wettability.

Alternatives have therefore been sought which provide greater permanency while altering reservoir surface wettability.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY

The degree of wettability of a surface exposed to hydrocarbons during their production from reservoirs may be altered and relative permeability of the formation improved by use of a surface modifying wettability agent containing an anchor and a hydrophobic/oleophobic tail portion and blocking moiety bound to the anchor. The blocking moiety increases the stability of the agent in the presence of water by slowing down hydrolysis at the formation surface.

In an embodiment, hydrophobicity and/or oleophobicity is imparted to a surface of a subterranean formation during production of hydrocarbons by pumping a surface modifying wettability agent into the well. The surface modifying wettability agent is comprised of an anchor selected from the group consisting of aluminum, silicon or a transition metal; one or more hydrophobic and/or oleophobic functional groups attached to the anchor, the hydrophobic and/or oleophobic functional group being a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether; and one or more -OB moieties directly or indirectly attached to the anchor, wherein each B represents a blocking group independently selected from $C_1$-$C_{20}$ branched or unbranched alkyl or aryl groups. A condensation reaction product is formed on the surface of the formation from the one or more -OB moieties and a free hydroxy group directly or indirectly attached to the surface of the formation.

In another embodiment, a method of imparting hydrophobicity and/or oleophobicity to a surface of a subterranean formation during production of hydrocarbons from the formation is provided wherein a surface modifying wettability agent is pumped into the well; the surface modifying wettability agent being of the structure $Z_m X(OB)_n$, wherein X is an anchor selected from the group consisting of aluminum, silicon and a transition metal; Z is a hydrophobic and/or oleophobic moiety attached to the anchor, the moiety comprising a member selected from a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether; OB represents a blocking moiety, B being selected from $C_1$-$C_{20}$ branched or unbranched alkyl or aryl group; and m+n is defined by the valence state of the anchor provided neither m nor n are zero. The hydrophobic/oleophobic tails of surface modifying wettability agents are aligned such that the hydrophobicity of the wettability agent is directed away from the surface of the formation. A condensation reaction product occurs directly or indirectly onto the surface of the formation between the one or more blocking moieties and a hydroxy group.

In another embodiment, a method of imparting hydrophobicity and/or oleophobicity to a surface of a subterranean formation during production of hydrocarbons is provided wherein hydroxy containing nanoparticles surface modified with a surface modifying wettability agent and further modified with a linking agent containing a blocking moiety, OB, are pumped into the well and allowed to bind with the formation surface. The surface modifying wettability agent is of the structure $Z_m X(OR)_n$ wherein X is an anchor selected from the group consisting of aluminum, silicon and a transition metal; Z is a hydrophobic and/or oleophobic moiety attached to the anchor, each moiety being independently selected from a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer or perfluoroalkylene ether; each R being independently selected from a $C_1$-$C_{20}$ branched or unbranched alkyl or aryl group; —OB represents a blocking moiety, B being a $C_1$-$C_{20}$ branched or unbranched alkyl or aryl group; and m+n is defined by the valence state of the anchor provided neither m nor n are zero.

The surface modifying wettability agents are aligned such that the hydrophobic and/or oleophobic moiety are directed away from the surface of the formation. A condensation reaction product is formed indirectly onto the surface of the formation from the one or more blocking moieties and a hydroxy group on the surface of the formation.

In another embodiment, a method of imparting hydrophobicity and/or oleophobicity to a surface of a subterranean formation penetrated by a well during production of hydrocarbons from the subterranean formation is provided. In this embodiment, hydroxy containing nanoparticles surface modified with a surface modifying wettability agent and a linking agent containing a blocking moiety, —OB, are pumped into the well. The nanoparticles bind to a surface of the subterranean formation. B of the blocking moiety is independently selected from $C_1$-$C_{20}$ branched or unbranched alkyl or aryl group. The surface modifying wettability agent is of the structure $Z_mX(OR)_n$ wherein X is an anchor selected from the group consisting of aluminum, silicon and a transition metal; each Z is a hydrophobic and/or oleophobic moiety attached to the anchor and is independently selected from a substantially non-branched fluorinated monomer of a member selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether; each R is independently selected from a $C_1$-$C_{20}$ branched or unbranched alkyl or aryl group; and m+n is defined by the valence state of the anchor provided neither m nor n are zero. The hydroxy containing nanoparticles are aligned to the surface of the subterranean formation such that the hydrophobic and/or oleophobic moiety is directed away from the surface of the formation. A condensation reaction product is formed directly or indirectly onto the surface of the formation from the one or more blocking moieties and a hydroxy group on the surface of the formation.

Characteristics and advantages of the present disclosure described above and additional features and benefits will be readily apparent to those skilled in the art upon consideration of the following detailed description of various embodiments and referring to the accompanying drawings.

DRAWINGS

The following figures are part of the present specification, included to demonstrate certain aspects of various embodiments of this disclosure and referenced in the detailed description wherein.

Figure 9:
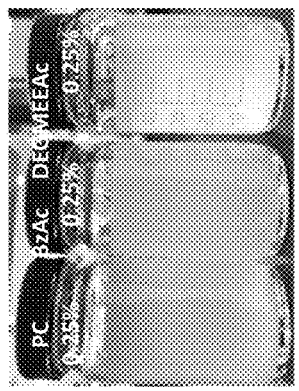
Figure 9:
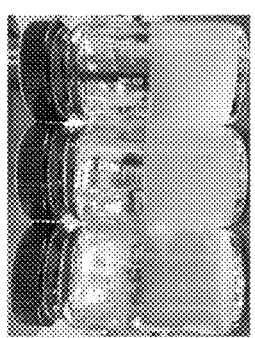
Figure 9:
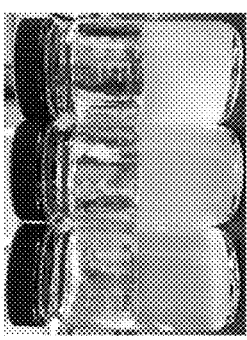
Figure 9:
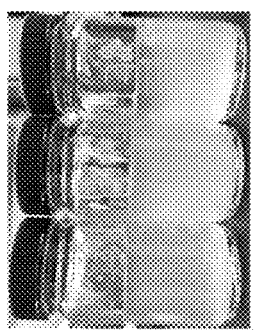
Figure 9:
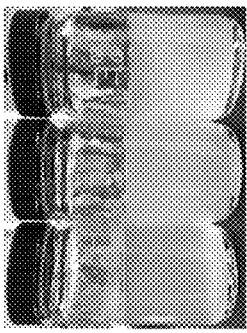
Figure 9:
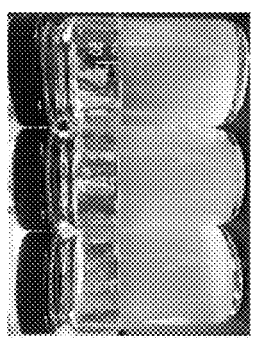
Figure 9:
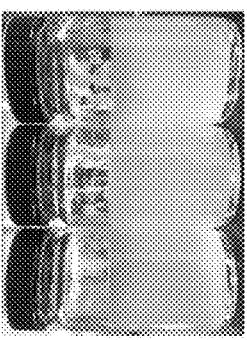
Figure 9:
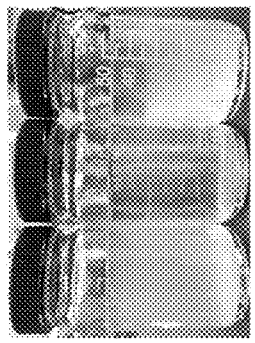
Figure 9:
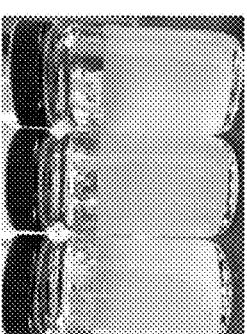

FIGS. 9 and 10 compare the stability of a non-treated perfluoropolymeric silane ether to a perfluoropolymeric silane ether treated with a blocking agent over a period of nine days.

DETAILED DESCRIPTION

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . "

Further, reference herein and in the appended claims to components and aspects in a singular tense does not necessarily limit the present disclosure or appended claims to only one such component or aspect, but should be interpreted generally to mean one or more, as may be suitable and desirable in each particular instance. The suffix "(s)" as used herein is intended to include both the singular and the plural of the term that it modifies, thereby including at least one of that term. The use of the terms "a" and "an" and "the" and similar referents in the context of describing the invention (especially in the context of the following claims) are to be construed to cover both the singular and the plural, unless otherwise indicated herein or clearly contradicted by context.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

All references are incorporated herein by reference.

The disclosure relates to methods of modifying a hydrophilic surface of a subterranean formation into a hydrophobic and/or oleophobic surface. The methods enhance the production of hydrocarbons from a subterranean formation by altering the wettability of the surface of the formation with a surface modifying wettability agent.

The surface modifying wettability agent has an anchor site to which is attached one or more blocking moieties and one or more hydrophobic and/or oleophobic functional groups. The hydrophobic and/or oleophobic functional groups may be referred to as the tail end of the surface modifying wettability agent and typically self-align such that the hydrophobicity character of the wettability agent is imparted away from the surface of the formation. Self-alignment is also believed to form a monolayer or multilayer assembly. It is believed this occurs by chemical binding-induced spontaneous organization of the tail on the surface of the anchor.

In an embodiment, the surface modifying wettability agent contains one or more moieties of the structural formula:

$$Z_mX(OB)_n \quad (I)$$

wherein:
X is the anchor;
Z is the hydrophobic and/or oleophobic moiety; and
OB is the blocking moiety; and
m+n is defined by the valence state of the anchor, provided neither m nor n is zero.

Where Z contains a moiety which is both hydrophobic and oleophobic, the surface modifying wettability agent may be regarded as being omniphobic.

In some instances, hydroxy containing nanoparticles are first attached to the surface of a subterranean formation through a difunctional linking agent having reactive groups such as —OH, —COOH and amino groups at its terminal ends. The difunctional linking agent may contain three to seven methylene groups between the terminal ends. One of the terminal ends may form a condensation product with a —OH group attached to the formation while the other terminal end may form a condensation product with a —OH group attached to the nanoparticle. The surface modifying wettability agent (I) may then attach to the formation through a condensation reaction product formed between the B group of the blocking moiety of the surface modifying wettability agent and a free hydroxy group on the nanoparticle attached to the formation through the difunctional linking agent.

In some instances, hydroxy containing nanoparticles may be modified with one or more surface modifying wettability agents of the formula:

$$Z_mX(OR)_n \quad (II)$$

wherein:
X, Z, m and n are as defined above and R is a $C_{1-20}$ branched or unbranched alkyl or aryl group. The modified nanoparticles may then be altered with a difunctional linking agent containing a reactive —OB moiety (B being defined above) on one of the terminal ends and a —OH, —COOH or amino group at the other terminal end. After being pumped into the well, a condensation product is formed in situ between the —B substituent of the —OB moiety and a hydroxy group attached to the formation.

In another embodiment, a difunctional linking agent containing a reactive —OB moiety on one end of the terminal end and a —OH, —COOH or amino group at the other end may be pumped into the formation with nanoparticles modified with the surface modifying wettability agent of formula (II) wherein B is as defined above. A condensation product is formed in-situ between the hydroxy groups bound to the formation and the blocking moiety —OB while the other terminal end of the difunctional linking agent forms a condensation product with a hydroxy group attached to the nanoparticle modified with the surface modifying wettability agent.

In an embodiment, the anchor, X, of the surface modifying wettability agent of (I) and (II) is silicon or is a metal selected from aluminum or a transition metal. Suitable transition metals include Group 3, 4, 5, or 6 metals. In an embodiment, the metal is a Group 4 metal, such as Ti, Zr or Hf, a Group 5 metal, such as Ta or Nb, a Group 6 metal, such as W, or a metal of the lanthanide series, such as La.

The hydrophobic moiety and/or oleophobic moiety and blocking moiety are attached to the anchor. In formula (I) and (II) m+n is defined by the valence state of anchor X provided neither m nor n are zero. For instance, where the valence state of anchor X is 4 (such as is Si or $Ti^{4+}$), m and n are from 1 to 3 and m+n is 4; where the valence state of anchor X is 3 (such as $Zr^{3+}$ or $Al^{3+}$), m and n is 1 or 2 and m+n is 3.

Where the surface modifying wettability agent of (I) has more than one-OB and/or hydrophobic/oleophobic functional groups (as well as the surface modifying wettability agent of (II) having more than one hydrophobic/oleophobic functional group), the functional groups may be the same or different. In other words, substituents for multiple —OB and/or hydrophobic/oleophobic functional groups may be independently selected from any of those recited herein.

In an embodiment, the hydrophobic/oleophobic tail may contain a hydrocarbon such as an alkyl, aryl, substituted alkyl or substituted aryl group. In a preferred embodiment, the hydrophobic and/or oleophobic moiety attached to the anchor is a long hydrocarbon chain or long chain halogenated hydrocarbon chain. The long chain hydrocarbon or halogenated hydrocarbon chain may be branched or unbranched. In an embodiment, the hydrophobic/oleophobic tail is substantially free of branching. The long chain hydrocarbon is preferably halogenated and most preferably fluorinated. Suitable hydrophobic and/or oleophobic moieties contain from about 3 to about 40, typically 3 to about 20, preferably from about 6 to 14, sometimes more preferably from about 8 to about 10, carbon atoms.

In an embodiment, the hydrophobic moiety and/or oleophobic moiety is a fluorinated ethylenically unsaturated monomer. Exemplary ethylenically unsaturated monomers are fluorinated acrylates and methacrylates such as perfluorohexyl methacrylate, perfluoroheptyl methacrylate, perfluorooctyl methacrylate, perfluorononyl perfluorodecyl methacrylate, perfluoroundecyl methacrylate or perfluorododecyl methacrylate.

In an embodiment, the hydrophobic and/or oleophobic moiety has at least one terminal trifluoromethyl group. For instance, the hydrophobic and/or oleophobic moiety may be a long chain hydrocarbon or fluorinated hydrocarbon containing one or more terminal trifluoromethyl group(s) and/or an ethylenically unsaturated monomer having one or more terminal trifluoromethyl groups. Exemplary of suitable fluorinated ethylenically unsaturated monomers having a terminal —$CF_3$ group include fluoroalkyl methacrylate monomers such as perfluorooctyl methacrylate having the chemical formula $C_7F_{15}CH_2OCOC(CH_3)=CH_2$.

The hydrophobic and/or oleophobic moiety may be polymeric; preferably, having a number average molecular weight of less than 2000.

Suitable monomers which may be polymerized include any of the halogenated (preferably fluorinated) long chain hydrocarbons referenced herein and one or more ethylenically unsaturated monomers. Suitable ethylenically unsaturated monomers include hexyl ethylenically unsaturated monomers, heptyl ethylenically unsaturated monomers, octyl ethylenically unsaturated monomers, nonyl ethylenically unsaturated monomers, decyl ethylenically unsaturated monomers, undecyl ethylenically unsaturated monomers, and dodecyl ethylenically unsaturated monomers as well as mixtures thereof. Such monomers may be fluorinated. As such, the polymeric hydrophobic and/or oleophobic moiety may be derived from a fluorinated ethylenically unsaturated monomer with a non-halogenated or halogenated long chain hydrocarbon as recited herein.

In a preferred embodiment, the hydrophobic and/or oleophobic moiety is a polymerization product of a monomer having terminal trifluoromethyl groups including ethylenically unsaturated monomers such as any of the monomers referenced in the paragraph above. In an embodiment, the hydrophobic and/or oleophobic moiety is a fluoroalkyl or perfluoroalkyl ethylenically unsaturated monomer having a terminal trifluoromethyl group. In an embodiment, the blocking moiety is a trifluoromethyl terminated, substantially unbranched perfluorooctyl monomer, such as a perfluorinated iso-octyl monomer having two terminal trifluoromethyl groups. In another embodiment, the blocking moiety may be a product of a substantially non-branched perfluoroalkyl unsaturated monomers having terminal trifluoromethyl groups, including fluorinated or perfluorinated monomers.

In another embodiment, the hydrophobic functional group (bonded to the anchor) is a fluorine containing moiety, such as $R_f$—$(CH_2)_p$— where $R_f$ is a perfluorinated alkyl group or a perfluorinated alkylene ether group and p is 2 to 4, preferably 2, or a perfluorinated hydrocarbon group including an oxygen substituted hydrocarbon group, such as a perfluorinated alkyl group or a perfluorinated alkylene ether group and p is 0 to 18, preferably 0 to 4, and X is a polar group such as a is carboxyl, like of the structure —(C=O)—OR; and R is hydrogen, perfluoroalkyl, alkyl or substituted alkyl containing from 1 to 50 carbon atoms, preferably from about 2 to about 20 carbon atoms in the alkyl group associated with the ester linkage.

Examples of perfluoroalkyl groups are those of the structure F—(CFY—$CF_2$)$_m$ where Y is F or $C_nF_{2n+1}$; m is 4 to 20 and n is 1 to 6.

Examples of perfluoroalkylene ether groups are those of the structure:

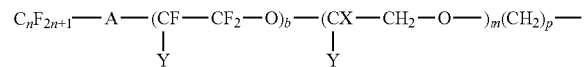

where A is an oxygen radical or a chemical bond such as $CF_2$; n is 1 to 20, preferably 1 to 6; Y is H, F, $C_nH_{2n+1}$ or $C_nF_{2n+1}$; b is at least 1, preferably 2 to 10, m is 0 to 50, and p is 1 to 20.

Preferred fluorinated materials are esters of perfluorinated alcohols such as the alcohols of the structure F—(CFY—$CF_2$)$_m$—$CH_2$—$CH_2$—OH where Y is F or $C_nF_{2n+1}$; m is 4 to 20 and n is 1 to 6.

The blocking moiety, —OB, controls and increases the stability of the surface modifying wettability agent in the presence of water. The blocking moiety typically consists of bulky hydrocarbons, as B, attached to an oxygen atom to form alkoxy groups. The presence of the —B group on the blocking moiety slows down or reduces reactivity of the X—O group of the surface modifying wettability agent.

Representative hydrocarbons as B include a $C_1$-$C_{20}$ (typically a $C_1$-$C_{12}$) branched or unbranched alkyl (preferably $C_1$-$C_8$ alkyl group and more preferably a $C_1$-$C_4$ alkyl group) or an aryl group (preferably a phenyl or alkyl substituted phenyl group). Exemplary hydrocarbons include methyl, ethyl, propyl, butyl, —$C(CH_3)_3$; —$(CH_2)_4$—$CH_3$ $CH(CH_3)_2)_3$ and phenyl. Generally, it is desirable for the blocking moiety to be of sufficient magnitude to increase steric hindrance around the anchor while maintaining the presence of the hydrophobic/oleophobic functional group(s). The rate of hydrolysis of the blocking moiety decreases as the size of the —B groups increase. In other words, as —B, is larger and branched, the rate of hydrolysis at the surface of the formation is slower.

Under in-situ conditions, a condensation product is formed on the surface of the formation from the reaction of a free hydroxy group which is (directly or indirectly) attached to the surface of the formation and the blocking moiety. Unwanted self-condensation of the surface modifying wettability agent results from the presence of the blocking moiety.

In an embodiment, anchor X is —Si and the surface modifying wettability agent may be a silyl ether containing a silicon atom covalently bonded to three blocking moieties, —OB. Representative silyl ethers include those of formula $SiOB^1OB^2OB^3$ wherein $B^1$, $B^2$ and $B^3$ independently represent a $C_1$-$C_{12}$ alkyl or aryl group (preferably $C_1$-$C_8$ alkyl group and more preferably a $C_1$-$C_4$ alkyl group). Preferred alkoxysilanes may be those which liberate methanol or ethanol; —ZOB defining the silane. The presence of the blocking moiety decreases the possibility of hydrolysis of siloxanes (as well as silanes). This provides greater stability to the resulting surface modifying wettability agent to water.

In an embodiment, the surface of the subterranean formation may be first modified to have a positive or negative charge prior to pumping the surface modifying wettability agent into the formation. This is usually desired when the surface of the formation does not contain free —OH groups. Such a modification provides a higher likelihood of adhesion of the surface modifying wettability agent (which may be attached to nanoparticles) to the hydrophilic surface. This may be unnecessary in some instances where surfaces of the formation have exposed hydroxy groups or silicon-oxo or the aluminum-oxo linkages.

Figure 1:
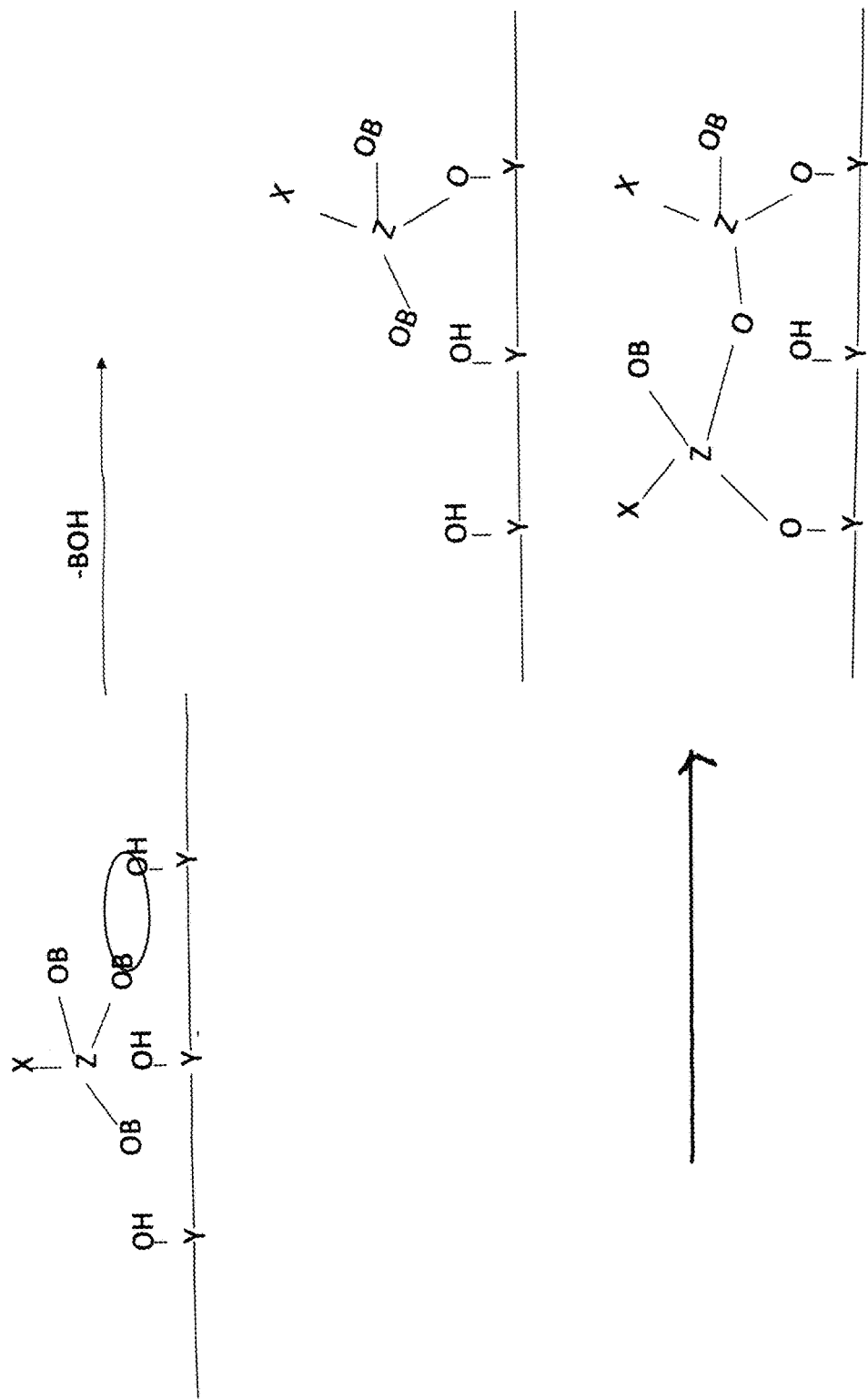
FIG. 1 illustrates a method of imparting hydrophobicity to a hydrophilic surface with a surface modifying wettability agent having an anchor, one or more hydrophobic and/or oleophobic functional groups attached to the anchor and one or more blocking moieties attached to the anchor.
Figure 2:
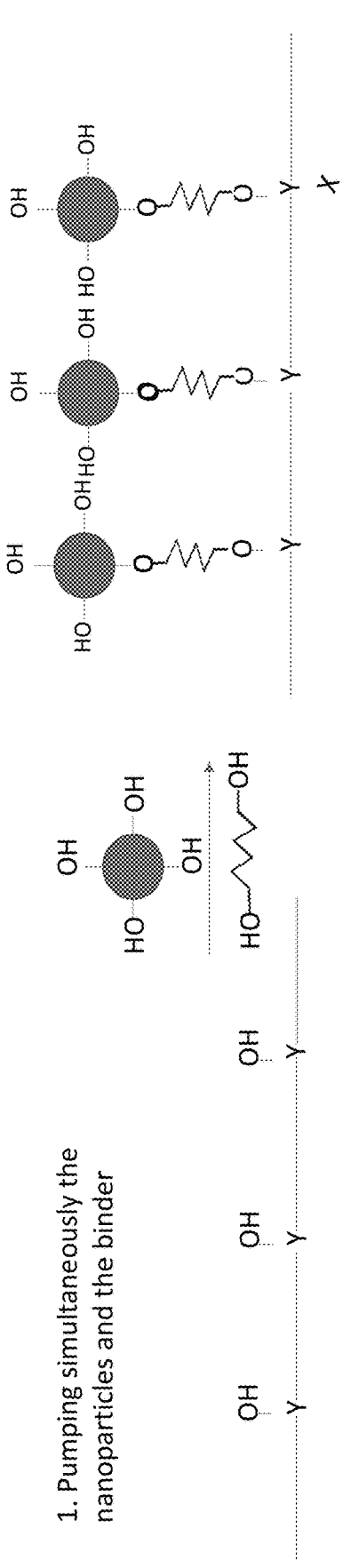
FIG. 2 illustrates a method of imparting hydrophobicity to a hydrophilic surface of a subterranean formation hydroxy containing nanoparticles altered with a surface modifying wettability agent having an anchor, one or more hydrophobic and/or oleophobic functional groups attached to the anchor and one or more blocking moieties attached to the anchor.
Figure 2:
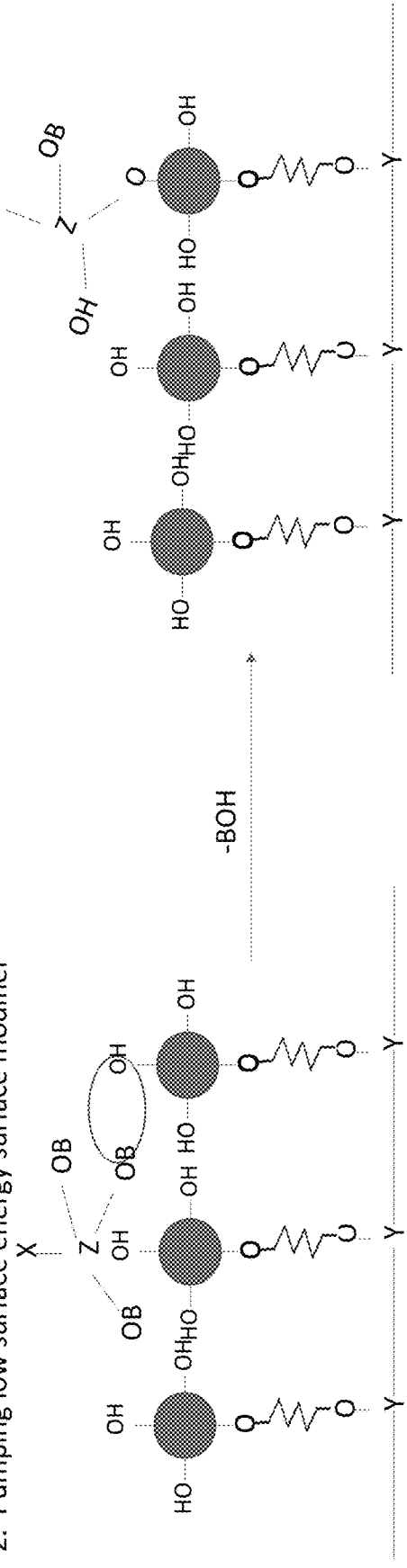

FIGS. 1 and 2 represent exemplary methods for attaching a surface modifying wettability agent (I) having a blocking moiety to the surface of a formation. FIG. 1 further illustrates the reactivity between the blocking moiety and hydroxy groups on the surface of the formation. As shown, the blocking moiety reacts with the exposed hydroxy groups on the formation. As illustrated in FIG. 2, the condensation reaction product is formed from the blocking moiety and a hydroxyl group indirectly attached to the formation (by being linked to a nanoparticle). The presence of the blocking moiety on the surface modifying wettability agent slows down reactivity of the Z—O group of the surface modifying wettability agent and retards hydrolysis.

As illustrated in FIG. 1, one or more of the free —OH groups on the surface of the subterranean formation may react with the B component of the blocking moiety to render a condensation product on the surface of the formation; the B—OH being a leaving group formed between the —B moiety and free —OH group. The surface modifying wettability agent is thereby directly linked to the surface of the formation.

FIG. 1 shows surface wettability modifying agents reacting with multiple —OH groups of the formation. Alternatively, a single molecule of surface modifying wettability agent having multiple blocking moieties, —OB, may react with multiple free hydroxy groups on the surface of the formation. When not prohibited by steric hindrance, multiple condensation reactions may occur between -OH groups of the formation and the blocking moiety of a single surface modifying wettability agent.

FIG. 2 represents an embodiment where the surface modifying wettability agent may be pumped into the well after the surface of the formation has been modified with nanoparticles. The blocking moiety of (I) reacts with the surface of the formation through a nanoparticle, wherein X, Y, Z and B are as defined above. (Nanoparticles which do not contain a free —OH group are typically modified to have exposed —OH groups on their surface.) As such, the surface modifying wettability agent may be indirectly attached to the surface of the formation through the nanoparticle.

FIG. 2 illustrates attaching a bifunctional linking agent as adhesion promoter onto the surface of a nanoparticle prior to the introduction of the nanoparticle into the formation. As used herein, bifunctional linking agents include molecules having —OH, —COOH or amino groups at their terminal ends. The bifunctional linking agent may further be a silane, siloxane, phophonate or phosphonic acid. In an embodiment, the linking agent is a glycolic substituent, typically containing 2 to 6 carbon atoms, like 1,4-butylene glycol or 1,6-hexane diol. Functional groups of the linking agent (shown as hydroxy groups in FIG. 2) modify the surface of the nanoparticles such that the nanoparticles may more easily attach to the surface of the formation. As shown in FIG. 2, the hydroxy groups of the linking agent form a covalent bond with free hydroxy groups of the nanoparticle through a condensation reaction. After the nanoparticles are attached to the surface of the formation, the surface modifying wettability agent may be pumped. As shown, one or more of the free —B moieties of the blocking group may react with a hydroxy group (OH) of the nanoparticles attached to the surface of the formation through the linking moiety; the B—OH being a leaving group being formed through a condensation reaction between the blocking moiety and the free —OH group. The hydrophobic and/or oleophobic tail of the surface modifying wettability agent is then exposed to hydrocarbon fluids as well as aqueous fluids within the formation. Hydrophobicity is imparted to the hydrophilic surface of the formation by the hydrophobic tail and the covalent bond formed between the blocking moiety and surface hydroxy groups.

One or more molecules of the surface modifying wettability agent may react with different hydroxy groups on the surface of the formation. Alternatively, a single molecule of surface modifying wettability agent having multiple blocking moieties may react with more than one free hydroxy group on the surface of the formation. Covalent bonds between the blocking moiety and a —OH group on the surface of the formation (or OH of a linking agent) may form on the surface of the formation (subject to restraints created through steric hindrance).

Figure 3:
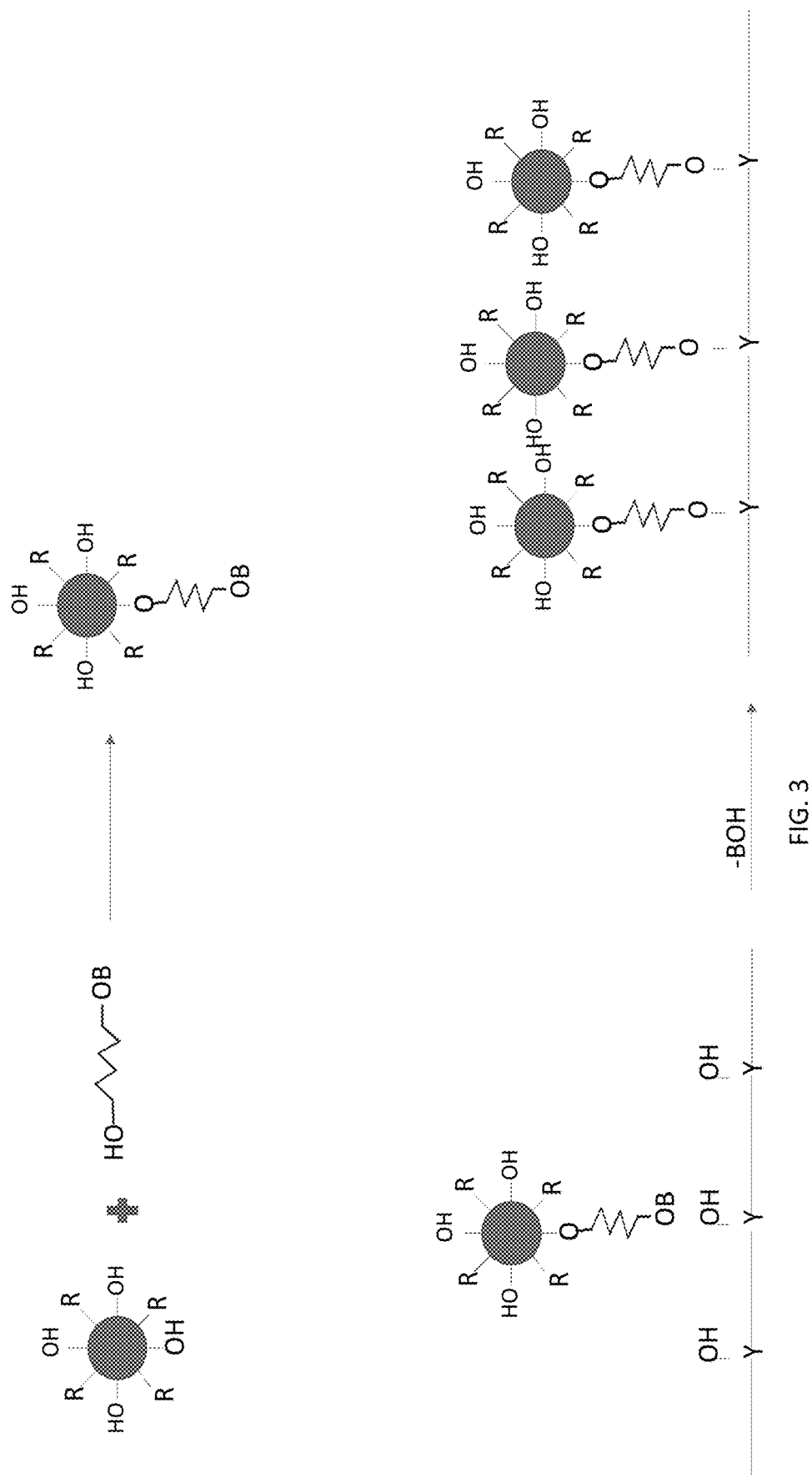
FIG. 3 illustrates a method of imparting hydrophobicity to a hydrophilic surface of a subterranean formation wherein hydroxy containing nanoparticles surface modified with a surface modifying wettability agent and further modified with a linking agent containing a blocking moiety are pumped into a subterranean formation.

FIG. 3 illustrates a hydroxy containing nanoparticle modified with surface modifying wettability agent of (II) and being further modified with the bifunctional linking agent with terminal —OB groups prior to pumping the nanoparticle into the formation. Blocking moiety, —OB, is attached to the nanoparticle through the linking agent; the linking agent being a modified glycol wherein the hydroxy group on one end of the glycol is substituted with the —B substituent. The —B substituent of the —OB group of the blocking moiety reacts with a free —OH group on the surface of the formation and a condensation reaction product is formed between the functionalized nanoparticle and formation.

FIG. 3 shows three molecules of surface modifying wettability agents of (II) being attached to a single nanoparticle. Each R may have anchor, M, attached to the surface of the nanoparticle(s). [In such instances, the formula (II) may be best represented as $Z_{m-1}X(OR)_n$. where Z, X, R, m and n are as defined above.]

Figure 4:
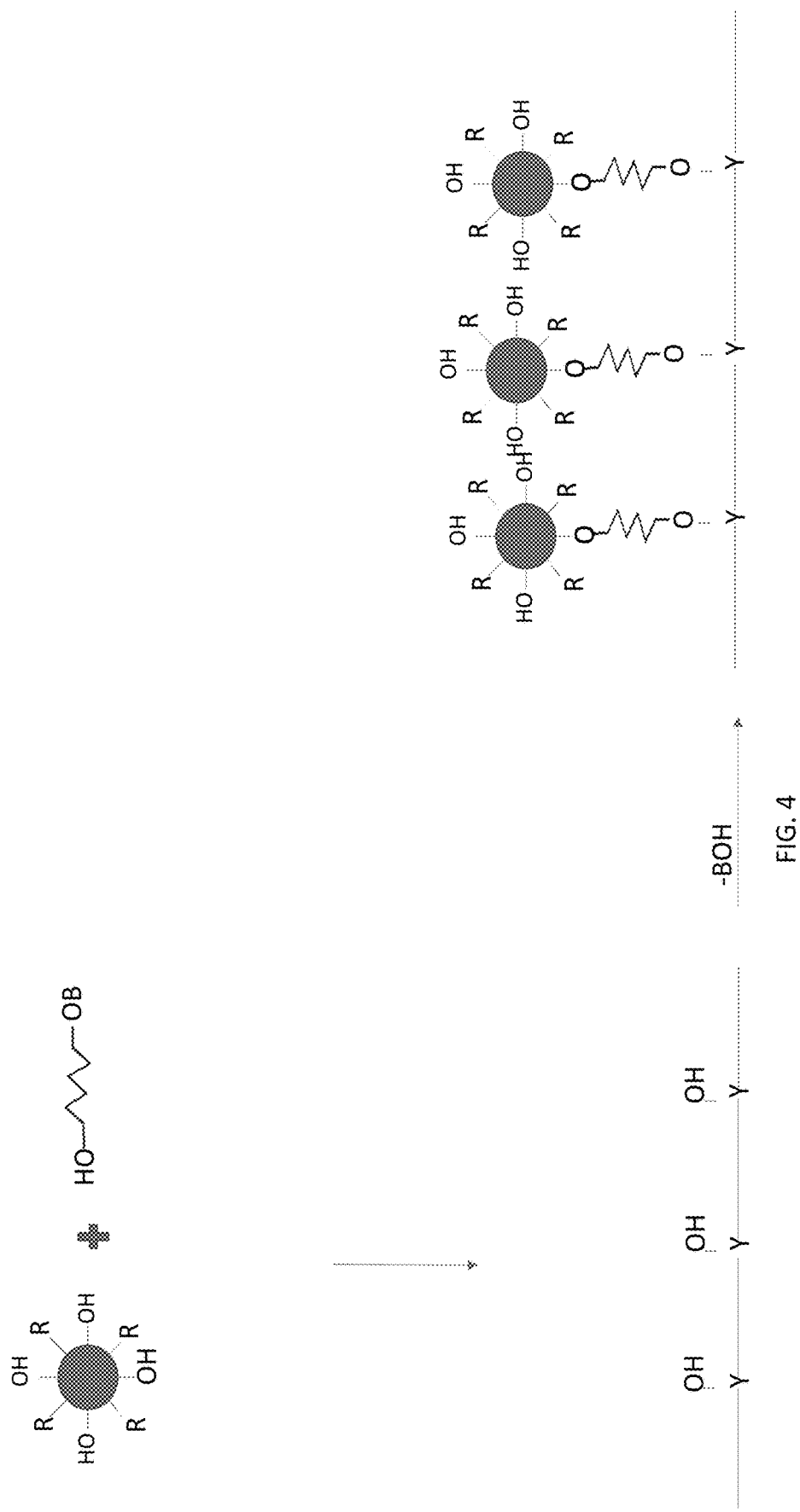
FIG. 4 illustrates a method of imparting hydrophobicity to a hydrophilic surface of a subterranean formation with hydroxy containing nanoparticles surface modified with a surface modifying wettability agent and with a linking agent having a blocking moiety.

As shown in FIG. 4, the bifunctional linking agent may contain blocking moiety, —OB, as a terminal end. Hydroxy containing nanoparticles modified with surface modifying wettability agents of (II), R, may be pumped into the well along with the bifunctional linking agent. A condensation product may be formed between a hydroxy group on the surface of the formation and —B of the blocking moiety. The other end of the linking group forms a condensation product with one of the hydroxy groups of the nanoparticles, thereby binding the surface modifying wettability agent (indirectly) onto the formation.

Hydroxy containing nanoparticles or altered nanoparticles pumped into the formation in any of the embodiments may be in the form of a dispersion wherein the dispersed size of the nanoparticles may range from about 1 to 1000 nm, 50 to about 500 nanometers in diameter, such as about 100 to about 250 nm. Further, the concentration of the nanoparticles (or functionalized nanoparticles) in the pumped fluid may be greater than 0.5% (about 41.7 pounds per thousand gallons ("pptg")) by weight based on the total weight of the fluid. For example, the concentration of nanoparticles can range from about 2% to about 20% by weight (about 167 pptg to about 1670 pptg).

Suitable nanoparticles include inorganic nanoparticles such as a metal or metalloid oxide or hydroxide like silica, alumina, titania, silicic acid, aluminum oxides, aluminum hydroxides, aluminum hydroxyoxides, aluminosilicates, zirconium oxides, zirconium hydroxides, zirconium hydroxyoxides, tungsten oxide or iron oxide as well as a metal or metalloid carbide like tungsten carbide, silicon carbide and boron carbide and metal or metalloid nitrides like titanium nitride, boron nitride and silicon nitride or a combination thereof. Metal nanoparticles include alkali metals, alkaline earth metals, inner transition metals (a lanthanide or actinide), a transition metal, or a post-transition metal. Examples of such metals include magnesium, aluminum, iron, tin, titanium, platinum, palladium, cobalt, nickel, vanadium, chromium, manganese, zirconium, ruthenium, hafnium, tantalum, tungsten, rhenium, osmium, alloys thereof as well as barium or strontium titanate or a combination thereof. Preferred nanoparticles include alumina, boehmite and zirconia.

Other suitable nanoparticles include fullerenes, nanotubes, graphenes like nanographite, nanodots, nanorods, nanodiamonds, polysilsesquioxanes, antimony oxide, vanadium oxide and magnesium oxide and mixtures thereof.

Fullerenes include cage-like hollow polyhedral allotropic carbon forms possessing a polyhedral structure and include those having from about 20 to about 100 carbon atoms.

Nanographites may be represented as clusters of plate-like sheets of graphite having a stacked structure of one or more layers of graphite of plate-like two-dimensional structures of fused hexagonal rings Suitable graphenes including nanographene and graphene fibers (graphene particles having an average largest dimension of greater than 1 µm, a second dimension of less than 1 µm, and an aspect ratio of greater than 10, where the graphene particles form an interbonded chain). The graphene and nanographene fibers are effectively two-dimensional particles having more than one layer of fused hexagonal rings. Typically, the graphene nanoparticles may be prepared by exfoliation of a graphite source such as nanographite, graphene or nanographene, graphite and intercalated graphite. Exemplary exfoliation methods include fluorination, acid intercalation as well as acid intercalation followed by high temperature treatment Exfoliation of the nanographite provides a nanographene having fewer layers than non-exfoliated nanographite. Exfoliation of nanographite may provide the nanographene as a single sheet only one molecule thick, or as a layered stack of sheets. In an embodiment, the exfoliated nanographene may have fewer than 50 single sheet layers and in another embodiment fewer than 5 single sheet layers.

Suitable nanotubes include carbon nanotubes, inorganic nanotubes (e.g., boron nitride nanotubes), metallated nanotubes or a combination thereof. Suitable nanotubes include single walled nanotubes (SWNTs) or multi-walled nanotubes (MWNTs).

Suitable polysilsesquioxanes (also referred to as polyorganosilsesquioxanes or polyhedral oligomeric silsesquioxanes (POSS) derivatives) are polyorganosilicon oxide compounds of general formula $RSiO_{1.5}$ (where R is an organic group such as methyl) having defined closed or open cage structures (closo or nido structures). Polysilsesquioxanes, including POSS structures may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

In addition, the nanoparticles may further be nano-layered silicates or nanoclays (hydrated or anhydrous silicate, plate-like minerals with a layered structure). Exemplary nanoclays include aluminosilicate clays like kaolins (including vermiculite), hallyosite, bentonite, smectites (including montmorillonite), saponite, beidellite, nontrite, hectorite, alllophane and illite as well as titanium sulfate and zirconium sulfate. The nanoclays may be exfoliated to separate individual sheets, or non-exfoliated. Other nanosized mineral fillers of similar structure which may be used include talc, micas including muscovite, phlogopite or phengite. Platelets of the nanoclay typically have a thickness of about 3 to about 1000 Angstroms, a size in the planar direction ranging from about 0.01 μm to 100 μm and a specific surface area in from about 90 to about 800 $m^2/g$. The aspect ratio (length versus thickness) is generally in the order of about 10 to about 10,000.

Further, the nanoparticles may be derivatized to include a variety of different functional groups such as, for example, carboxy (e.g., carboxylic acid and anhydride groups like maleic anhydride), epoxy, ether, ketone, amine, hydroxy, alkoxy, alkyl, aryl, aralkyl, alkaryl, lactone as well as functionalized polymeric or oligomeric groups. In an embodiment, the nanoparticles include a combination of derivatized nanoparticles and underivatized nanoparticles.

The nanoparticles may further be derivatized to include one or more functional groups that are hydrophilic, hydrophobic, oxophilic, lipophilic, or oleophilic. In an embodiment, such functional groups may include (i) organosilicon materials, (ii) fluorinated organic acids or a reactive derivative; (iii) linear or branched alkyl organic acids or a reactive derivative, (iv) substituted alkyl organic acids or a reactive derivative, (v) aryl or substituted aryl organic acids or a reactive derivative as well as (vi) mixtures thereof.

In an embodiment, the water wetness property of a surface (including water saturation of the surface) may be altered by modifying the surface with the hydrophobically and/or oleophobically surface modifying wettability agent of (I) or (II) described herein. For instance, treatment of the surface of the formation with the surface modifying wettability agent may make the surface of the formation neutrally wet. In contrast to fully water wet surfaces wherein water occupies small pores and contracts the majority of the rock surface and fully oil wet surfaces where the position of fluid is reversed such that oil occupies the smaller pores and spreads over the majority of the rock (while the water occupies the larger pores), the surface modifying wettability agent may provide a neutrally wet surface which has no preference for either oil or water.

Permeability of the formation may be enhanced by controlling the degree of water saturation of the surface of the formation by modifying the surface with the hydrophobically and/or oleophobically surface modifying wettability agents. For instance, since increased water saturation may decrease the permeability of a formation, reducing the amount of saturated water in the formation by attaching the surface modifying wettability agent to the surface of the formation may enhance relative permeability.

When used to treat a subterranean formation, the contact angle between the surface modifying wettability agent attached to the formation and the aqueous fluid in the formation is greater than or equal to 60°, usually greater than or equal to 75°. A contact angle above 60° is indicative of the oleophobic nature of the substrate of the formation after treatment with the surface modifying wettability agent. Typically, the contact angle between the surface modifying wettability agent and the aqueous fluid in the formation is greater than or equal to 80°, in some cases greater than 105°, and is often greater than or equal to 150°, and in some cases greater than or equal to 175°. The contact angle is a measure of hydrophobicity. Typically, a liquid is considered to be "non-wet" or hydrophilic when the contact angle is less than 90° and "non-wetting" or hydrophobic when the contact angle is greater than 90°. A surface having a water contact angle greater than 150° is usually termed "ultra-hydrophobic" or "super-hydrophobic" characterizing a water-repellant surface. A super-hydrophobic surface may have a contact angle hysteresis less than 10°; in some cases, less than 5°. When the contact angle is less than 90°, the wetting tendency of the surface modified substrate may become greater when the substrate is rough versus smooth. When the contact angle is greater than 90°, the substrate may repel more when the substrate is rough. Thus, the high contact angle is indicative of the super-hydrophobic nature of the substrate of the formation after treatment with the surface modifying wettability agent.

Further, surface tension may be reduced by the presence of the surface modifying wettability agent, i.e., surface tension of the surface of a formation has been shown to be less after the surface modifying wettability agent is attached to the surface than before the surface modifying wettability agent is attached to the surface. Generally, surfactants are not necessary for lowering the surface tension and increasing the contact angle.

Attachment of the surface modifying wettability agent to the surface to render the surface hydrophobic and/or oleophobic may further alter the surface energy of the formation being treated. Use of the surface modifying wettability agent for attachment to the surface makes the surface of the formation more rough (or less smooth). Low surface energy is imparted to the surface by the hydrophobic and/or oleophobic treating agent. The result is the in-situ functionalization of the surface of the formation. The methods described herein may be viewed as a procedure for mimicking the Lotus effect, a wettability phenomenon, downhole. The Lotus effect requires surface roughness and a low surface energy component. The hydrophobic and/or oleophobic surface modifying wettability agents alter (lower) the surface energy of the formation while controlling surface roughness of the formation surface. Functionalization of the surface of the formation permanently and positively affects the movement of fluids through the formation while decreasing water saturation. Conductivity of the formation to water and oil is improved.

The surface modifying wettability agent, when bound to a surface of the formation, reduces friction of a fluid within the well. Water and thus aqueous fluids within the well may easily slide across the surface of the substrate carrying hydrocarbons with it as lateral adhesion of the fluid to the formation surface is reduced. Thus, the hydrophobic and/or oleophobic functional groups lower water saturation and enhance recovery of water from the formation surface.

The subterranean formation, onto which the surface modifying wettability agent is bond, may be a siliceous formation, such as sandstone, as well as a metal oxide containing formation, including carbonate formations. The formation may be enriched in clay and the metal may include alumina.

In addition to modifying the hydrophilicity of surfaces of the reservoir, any of the surface modifying wettability agents disclosed herein may also be used to change the hydrophilic nature of metallic tubes and pipes, as well as tubulars, within a reservoir. Typically, in order to do so, the surface of the tubular is typically modified so as to contain free-OH groups. In an embodiment, it may be desirable to pre-treat the surface with a known treating agent to reduce free-OH groups which could form on the surface from rust or weathered iron.

The surface modifying wettability agent as well as the nanoparticles modified with the surface modifying wettability agent or a composition containing the same may be pumped into the formation as a component of a well treatment fluid. The well treatment fluid may contain a diluent. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds such as perfluorinated tetrahydrofuran. Also, aqueous alkaline solutions such as sodium and potassium hydroxide can be used as the diluent. The concentration of the hydrophobic and/or oleophobic surface modifying wettability agent in the well treatment fluid or the surface modified nanoparticles, when pumped into well, is 0.01% to 100% or more typically between 0.1% to 20% (v/v). Further, they may carry a charge that results in an electric potential in the dispersion, otherwise known as Zeta potential. All values for Zeta potential in the present disclosure are in units of millivolts, unless otherwise stated.

The Zeta potential of the dispersion can be varied in order to control the viscosity of the fluid pumped into the well. The viscosity of the fluid increases with decreasing Zeta potential. Increases in viscosity vary depending on, among other things, the type and concentration of nanoparticles in the fluid and the pH of the fluid. The viscosity of the fluid can thus be controlled by increasing or decreasing the Zeta potential.

Examples of suitable methods for adjusting Zeta potential of the fluids include controlling the pH of the fluid and adding surfactants and/or esters to the fluid. Controlling the pH can be performed by adding a pH adjuster to the well servicing fluid. Examples of pH adjusters include commonly used acids and bases, buffers and mixtures of acids and bases. For example, caustic (e.g., NaOH, KOH or Ca(OH)$_2$), sodium bicarbonate, potassium carbonate, and sodium carbonate can be employed. Examples of acids that can be used include hydrochloric acid, acetic acid, citric acid, formic acid, fumaric acid, and sulfamic acid. The range of pH of the fluid can be any suitable range, such as about 2 to about 14.

Examples of suitable esters that can also be employed to shift the Zeta potential include esters of polycarboxylic acid, such as an ester of oxalic, malonic, succinic, malic, tartaric, citric, phthalic, ethylenediamine tetraacetic (EDTA), nitrilotriacetic and other carboxylic acids. Examples of a suitable ester compounds include citrates, such as acetyl triethyl citrate, oxalates, and ethylenediamine tetraacetates, as described in U.S. Pat. No. 6,983,801, herein incorporated by reference. Esters are known for providing a delayed reduction in viscosity due to the relatively slow hydrolysis of the ester. The products of hydrolysis include polycarboxylate anions that can affect the ionic strength and/or pH of the fluid, and thereby shift the Zeta potential back to provide a desired reduced viscosity.

The surface modifying wettability agents impede the permeability of water in water saturated zones of a producing formation without reducing relative permeability to oil or gas. Since relative permeability is dependent on the pore structure and size, wettability of the formation surface and capillary pressure of the water within the formation, in some instances, such as where the formation is characterized by larger pores, water and oil permeability may be improved. The surface modifying wettability agents are particularly effective in oil saturated sandstone formations while exhibiting the ability to decrease water permeability substantially in water saturated zones. In addition to improve the stability of the silane formulation, the surface modifying wettability agent (with or without nanoparticles) may be applied to the surfaces without any disrupted properties and performance.

The surface modifying wettability agents disclosed herein may alter the surface energy of the formation being treated. By covalently bonding the surface modifying wettability agent through its blocked moiety, robust engineered interfaces result with low surface energy. The attachment of the surface modifying wettability agents onto the surface of the formation reduces the surface energy of the substrate likely by reducing the charge density on the surface.

In addition to lowering the water saturation and enhancing recovery of water from the formation surface, attachment of the surface modifying wettability agents onto the formation further may prevent spalling of fines by altering the zeta potential of formation fines. Migration of fines into producing areas of the formation is minimized and in-situ fines generation is minimized or stabilized.

Particulates of a weakly consolidated, semi consolidated or unconsolidated formation may further be consolidated by use of the surface modifying wettability agents disclosed herein. The bonding of the surface modifying wettability agents on the surface formation prevents or minimizes the influx of fluids into the formation. Aggregation of the particulates results from the reduction in charge density.

Upon being pumped into the formation, the surface modifying wettability agents may enter into the pore spaces of the formation. Multiple interactions of molecules of the surface modifying wettability agents with formation particulates causes aggregation or agglomeration of formation particulates. Further, it is believed, that the reactivity of the surface modifying wettability agents with formation surfaces or portions of formation surfaces creates an aggregation or agglomeration of the hydrophobic portion of the surface modifying wettability agents in near proximity to the formation surface. The use of the surface modifying wettability agents as a means to consolidate particulates of the formation is particularly effective in the treatment of shale formations.

In another embodiment, the swelling, dispersement, disintegration, migration and otherwise disruption of clay in oil and gas producing formations may be decreased by use of the surface modifying wettability agents and native fluid production may dislodge fines in a pore throat. The degree of swelling, as well as migration of clay particles, is often increased when formation clays are disturbed by foreign substances, such as aqueous well treatment fluids. Like fines formation, the swelling and migration of formation clays presents problems during stimulation and well completion, such as by increasing the bulk volume of treatment fluids. For instance, clays, in the presence of well treatment fluids, often expand and may be disrupted by becoming unconsolidated, thereby producing particles which migrate into a borehole. The presence of the surface modifying wettability agents prevents the swelling and migration of formation clay particles. Thus, by obstruction of formation capillaries, swelling and migration of formation clay may be reduced or prevented by the use of the surface modifying wettability agents disclosed herein. Loss of formation permeability is thus minimized to create little, if any, reduction in the flow rate of hydrocarbons.

In a preferred embodiment, the surface modifying wettability agents may be used in the treatment of a shale formation or a clay-rich formation in order to coat the surface of the formation to reduce water absorption or imbibement of water in order to reduce swelling.

The surface modifying wettability agents disclosed herein may also be used in the treatment of rich gas or retrograde condensate gas reservoirs and thus presents value to retrograde gas fields by increasing condensate production. In such reservoirs, heavy end fraction of gases may be precipitated in liquid form from solution in the gas as the reservoir pressure within the well is decreased below the dew point of the gas. Condensed liquid drains downward by gravity when its saturation exceeds the irreducible condensate saturation. With retrograde gases, liquids cannot be reabsorbed into the gas phase even if pressure is increased by a rate reduction. When a well treatment fluid containing the surface modifying wettability agents disclosed herein is pumped into a retrograde gas well, the permeability of the formation may be maintained, and condensate dropout minimized. Thus, in turn, minimizes the possibility of the formation of an emulsion between precipitated hydrocarbons and the invading water from the aqueous based well treatment fluid. The pressure below the dew point of the hydrocarbons may therefore be maintained. By enhancing the permeability of the formation to liquid hydrocarbons, loss of light condensate liquids is minimized and light condensate liquids may therefore be more readily displaced.

The surface modifying wettability agents disclosed herein may also be used to enhance load\water recovery. The hydrophobic nature of the surface modifying wettability agents provides increased recovery of flowback water from the well after fracturing fluid has been returned to the surface. In some instances, flowback water may be as low as 25%, while in some cases can be as high as 75%, of the volume of fluid that was injected into the well. This application is particularly useful in shale fractures having a complex of narrow fractures with limited conductivity where a low range of fluid recovery values (30% or less) are typically experienced. This lack of recovery is often interpreted as causing formation damage (from residual polymer gels residues), resulting in lowered gas/oil production. Methods as described in this disclosure that results in increased water recovered from the shale-type formation can thus be interpreted to reduce formation damage, and hence improve well productivity. For instance, in a typical fracturing job on a Marcellus shale formation, 20,000 to 150,000 barrels of fracturing fluid may be pumped into the well, depending upon the number of stages pumped.

The hydrophobic nature of the surface modifying wettability agents may further serve to control water condensation in the pores of a near wellbore region of a permeable formation. Often, the liquid zone formed from the condensation of hydrocarbons within a gas reservoir close to the wellbore hampers gas flow, reducing the productivity of the well the formation of "water block" or "water bank" zones. Condensation of water in the pores of a near wellbore region of a permeable formation may be decreased by the presence of the surface modifying wettability agent. Fluid transfer and water flux through the pores of the near wellbore region of the formation may be controlled by inhibiting the formation of a water bank by the surface modifying wettability agents.

In another embodiment, the surface modifying wettability agents may be used in an acidizing operation in order to increase the penetration of acid into the formation. Since the surface modifying wettability agents are either on or in close proximity to the formation face, reaction of acid with the formation surface may be retarded. The reactive acid may therefore etch the formation in more distant areas from the port of entry of the treatment fluid. Deeper acid penetration in the well may therefore result.

Further, the surface modifying wettability agents may be used to shut-off water into a formation. In this regard, the surface modifying wettability agent finds particular applicability in the treatment of matrix formations having finer grained particles between larger rock particles or finer grained particles in which the larger particles are embedded. The hydrophobic nature of surface modifying wettability agents reduces the influx of water into matrix formations characterized by low permeability. Further, matrix formations produce a large amount of water due to an influx of water into the wellbore. Over time, the amount or percentage of produced water may increase resulting in a corresponding decrease in the production of desired hydrocarbons, eventually rendering further production of hydrocarbons from the well uneconomical. The flow of water into the formation is blocked or otherwise abated. This results in increased rates in hydrocarbon production and ultimately increases recoverable reserves.

In an embodiment, the surface modifying wettability agents may function as a passive anti-microbial agent in order to counter bacterial growth principally caused by nitrogen and/or phosphorus in formation water or within fluid injected into the formation. The surface modifying wettability agents may repel the fluid from the formation and thus decrease contact time of the fluid in the formation. This prevents the build-up of aerobic bacteria, anaerobic bacteria and other microbials.

In another embodiment, the surface modifying wettability agents may be used to passively inhibit, control, prevent or remove scale deposition onto or within the formation. The hydrophobic nature of the surface modifying wettability agents minimizes or decreases the ability of such materials to adhere to the formation. This may be attributable to the hydrophobic nature of such mineral scales as calcium, barium, magnesium salts and the like including barium sulfate, calcium sulfate, and calcium carbonate scales. The surface modifying wettability agents may further have applicability in the treatment of other inorganic scales, such as metal sulfide scales, like zinc sulfide, iron sulfide, etc. Since such scales tend to plug the pore spaces and reduce the porosity and permeability of the formation, the surface modifying wettability agents described herein improve the permeability of the formation.

When coated onto the substrate of the formation being treated, the bulky nature of the hydrocarbon tail of the surface modifying wettability agent prevents or controls deposition of organic particulates onto the formation substrate, fines are returned to the surface with the fluid. In addition, bonding of the metal of the surface modifying wettability agent onto the formation minimizes binding sites for such organic particulates. Thus, the surface modifying wettability agents may be used to control or prevent the deposition of organic materials (such as paraffins and/or asphaltenes) within or onto the formation. Such solids and particulates are known to negatively impact the overall efficiency of completion of wells and, like scale inhibitors, can precipitate from produced water and create blockages in flow paths within the formation. The formation and deposition of such unwanted contaminants decrease permeability of the subterranean formation, reduce well productivity, and, in some cases, may completely block well tubing.

In addition, at least a portion of a tool or pipe exposed to hydrocarbons during the production of the hydrocarbons from the subterranean formation may be coated with the surface modifying wettability agents. Typically, the tool or pipe is coated with the surface modifying wettability agents prior to introducing the tool or pipe into the well.

EXAMPLES

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Figure 5:
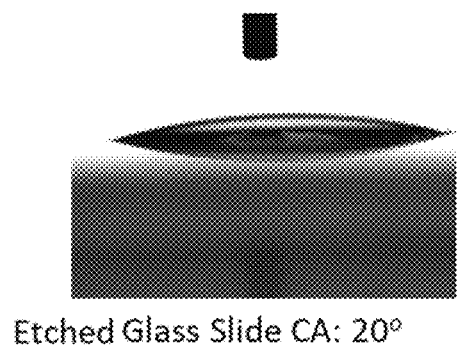
FIG. 5 illustrates the super-hydrophobic behavior of a surface treated with nanoparticles functionalized with a surface modifying wettability agent having a Si anchor and hydrophobic long fluoro substituted alkane.
Figure 5:
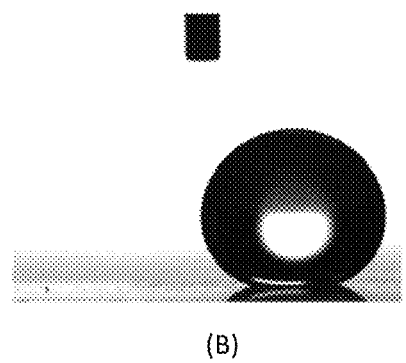
Figure 5:
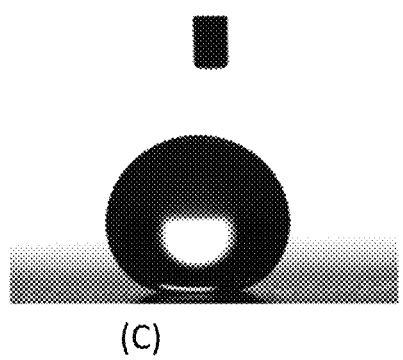

Example 1. Silica nanoparticles were dispersed in an alcohol solution then coated onto the surface of etched glass. FIG. 5(A) demonstrates the hydrophilic behavior of the coated glass and exhibits a contact angle of 20°. The nanoparticles where then functionalized with a surface modifying wettability agent of the formula $Z_mX(OR)_n$ wherein anchor, (X), is Si and hydrophobic long alkane chains (Z) contain a fluoro group, Z, by mixing the silica nanoparticles with the surface modifying wettability agent. The mixture was left to react at room temperature for a few hours. To increase the longevity of the coating in the formation, the functionalized nanoparticles were mixed with a silane linking agent, commercially available as Silres BS 25A. After the nanoparticles were surface modified, the mixture containing the surface modified nanoparticles was coated onto a slide and then dried. FIG. 5(B) shows the functionalized nanoparticles containing the surface modified nanoparticles being coated on the glass and illustrates the super hydrophobic behavior of the coated glass. In FIG. 5(C), the coating contains an additional linking agent to ensure longevity of this coating in the formation. This illustrates the ability of the modified surface to retain super-hydrophobic behavior. The contact angle of (B) and (C) was 148° and 150°, respectively.

Figure 6:
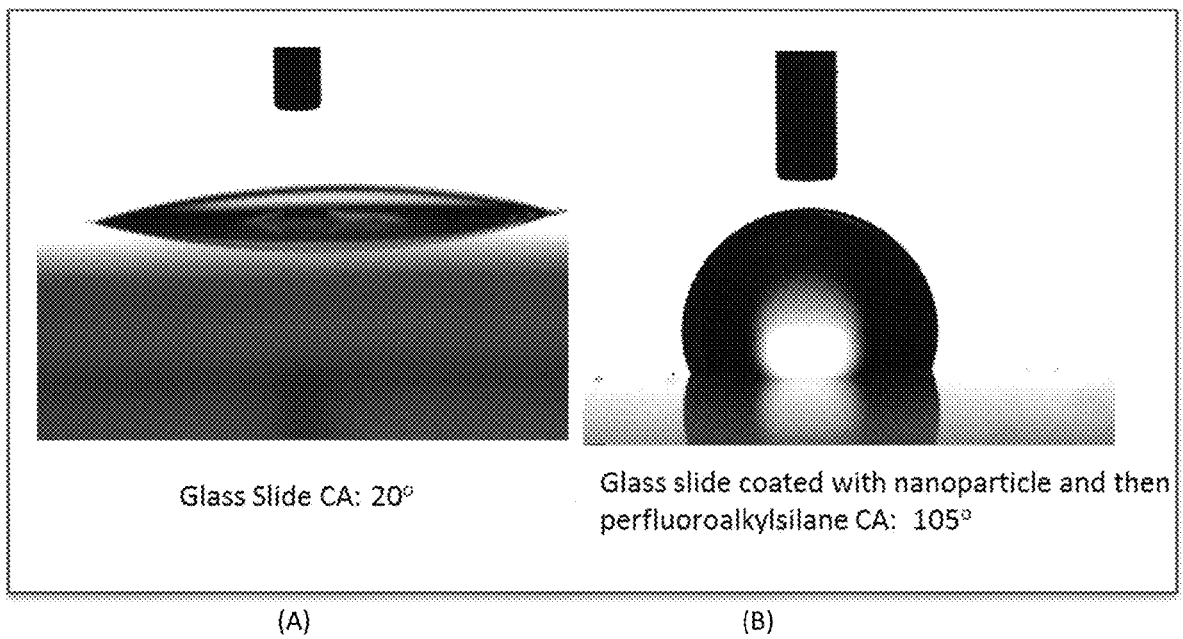
FIG. 6 illustrates the super-hydrophobic behavior of a surface treated with nanoparticles functionalized with a surface modifying wettability agent of a perfluoroalkylsilane.

Example 2. Silica nanoparticles were dispersed in an alcohol solution, then coated on the surface of etched glass. FIG. 6(A) shows hydrophilic behavior of the coated glass and exhibiting a contact angle of 20°. The nanoparticles were then functionalized with a surface modifying wettability agent of a perfluoroalkylsilane and represented by the formula $Z_mX(OR)_n$ wherein anchor, X, is Si and hydrophobic chain (Z) contains fluoro group, Z, by dipping the slide into the alcohol solution. The mixture was left to react at room temperature for two hours. FIG. 6(B) shows the super hydrophobic behavior of the coated glass of 105°.

Figure 7:
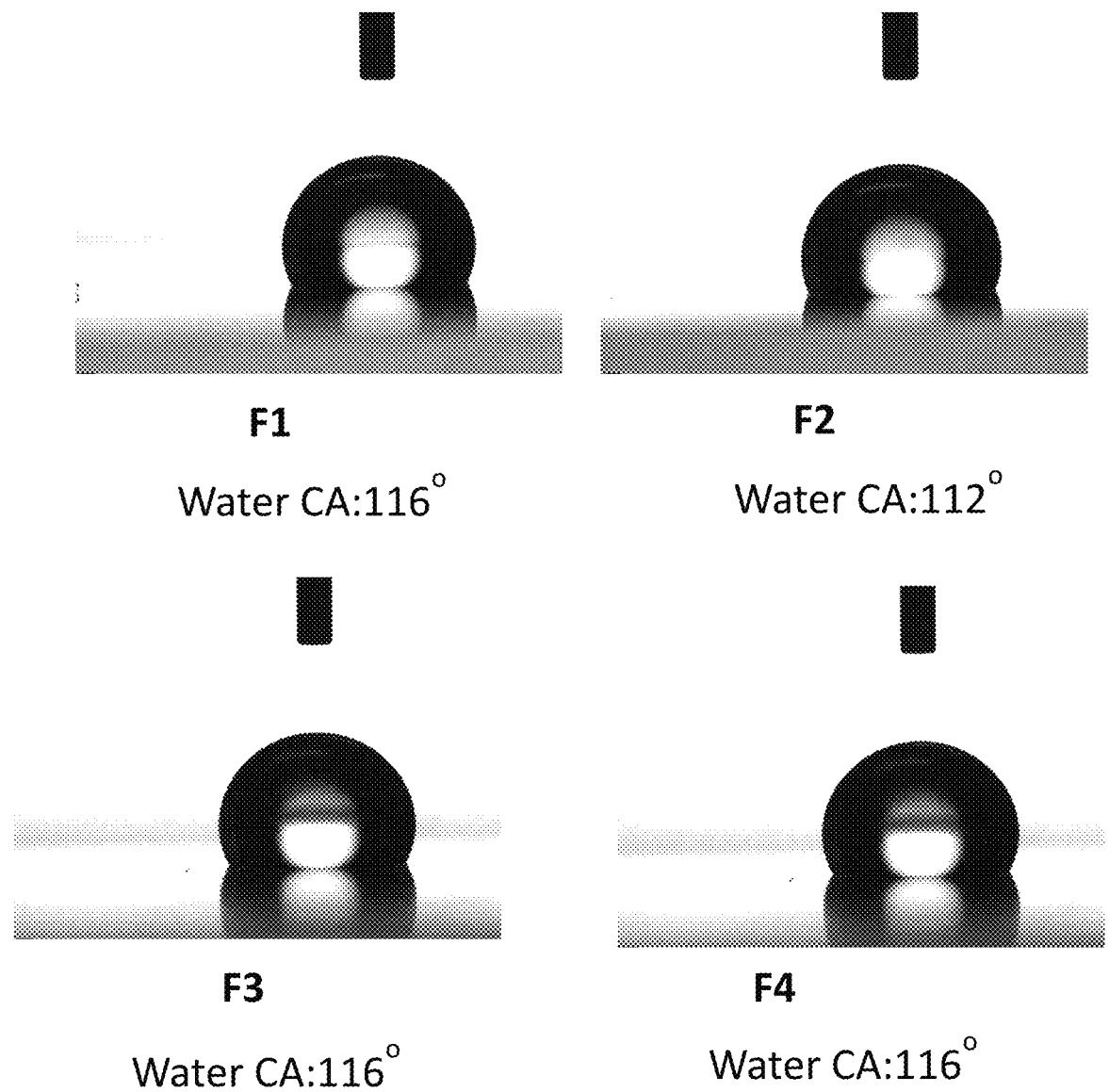
FIG. 7 illustrates the hydrophobic behavior of a surface modifying wettability agent having terminal trialkoxysilane groups and a fluoro containing hydrophobic chain.

Example 3. Glass slides were treated with polymers containing fluorogroups by dispersing the polymers in an organic solvent and then coating the polymer onto the glass slides. Referring to FIG. 7, the surface modifiers were polymers of silanes containing hydrophobic fluoropolymers terminated with triethyoxysilane groups (F1), a bifunctional perfluoropolyether (PFPFE) (F2) and a fluoroacrylic polymer solution (F3 and F4). The slides were dipped or sprayed into the surface modifier solution. The slides were then left at room temperature for a few hours to dry. FIG. 7 shows the contact angle of 116°, 112°, 116° and 116°, respectively, of the treated surfaces and demonstrates the hydrophobic behavior of the treated surfaces.

Figure 8:
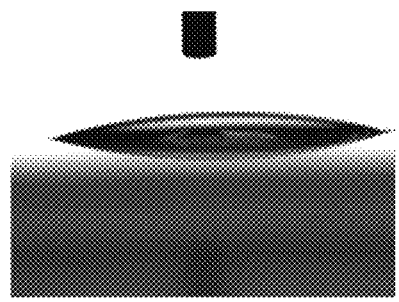
FIG. 8 illustrates the hydrophobic behavior of a surface treated with a surface modifying wettability agent as defined herein.
Figure 8:
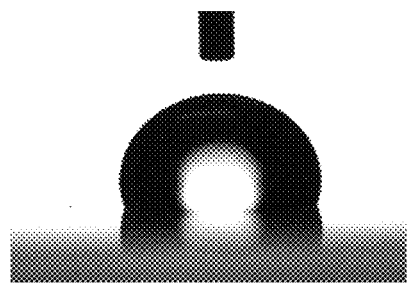

Example 4. Glass slides were functionalized with a surface modifying wettability agent defined by formula (I) wherein the anchor, X, is Si, the hydrophobic moiety being a perfluorinated alkyl group and the blocking agent being a —OB group wherein B is a branched alkyl group. The slides were dipped or sprayed into a solution containing the surface modifying wettability agent and then left at room temperature for a few hours to dry. FIG. 8 shows the contact angle of the treated surfaces as 103° which establishes the hydrophobic behavior of the treated surface vs. the contact angle of the untreated surface at 20° illustrating the hydrophilic behavior of the etched glass prior to surface modification.

Example 5. The stability of a commercial perfluoropolymeric silane ether was compared to the same silane ether derivatized with a blocking agent in a 0.25 M solution of propylene carbonate, benzyl acetate and diethyleneglycol monoethylether acetate. Observations of the untreated silane ether were conducted over a period of nine days. Precipitation of the untreated silane ethers occurred after the third day (FIG. 9) in contrast to the treated silane ether where no visible precipitation was observed even after nine days (FIG. 10).

Embodiment 1. A method of imparting hydrophobicity and/or oleophobicity to a surface of a subterranean formation penetrated by a well during production of hydrocarbons from the well comprising:
(a) pumping a surface modifying wettability agent into the well wherein the surface modifying wettability agent is comprised of:
(i) an anchor selected from the group consisting of aluminum, silicon and a transition metal;
(ii) one or more hydrophobic and/or oleophobic functional groups attached to the anchor, the hydrophobic and/or oleophobic functional group independently selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether; and
(iii) one or more-OB moieties directly or indirectly attached to the anchor, wherein each B is independently selected from $C_1$-$C_{20}$ branched or unbranched alkyl or aryl group; and
(b) forming a condensation reaction product on the surface of the formation from the one or more-OB moieties and a free hydroxy group directly or indirectly attached to the surface of the formation.

Embodiment 2. The method of Embodiment 1, wherein the free hydroxy group is directly attached on the surface of the subterranean formation.

Embodiment 3. The method of Embodiment 1, wherein the free hydroxy group is attached to a surface of a nanoparticle.

Embodiment 4. The method of Embodiment 1 or 2, wherein the surface of the subterranean formation is modified with nanoparticles having one or more free hydroxy groups prior to the introduction of the surface modifying wettability agent into the well and further wherein the condensation reaction product is formed by the reaction of one or more of the blocking moieties and the one or more free hydroxy groups on the surface of the nanoparticles.

Embodiment 5. The method of any of Embodiments 1 to 4, wherein the surface modifying wettability agent is of the formula:

$$Z_mX(OB)_n \qquad (I)$$

wherein:
X is the anchor;
Z is the hydrophobic and/or oleophobic moiety;
OB is the blocking moiety; and
m+n is defined by the valence state of the anchor provided neither m nor n are zero.

Embodiment 6. A method of imparting hydrophobicity and/or oleophobicity to a surface of a subterranean formation penetrated by a well during production of hydrocarbons from the subterranean formation comprising:
(a) pumping into the well a surface modifying wettability agent of the structure:

$$Z_mX(OB)_n \qquad (I)$$

wherein:
X is an anchor selected from the group consisting of aluminum, silicon and a transition metal;
Z is a hydrophobic and/or oleophobic moiety attached to the anchor, the moiety comprising the hydrophobic and/or oleophobic functional group independently selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether;
OB represents a blocking moiety; each B being independently selected from a $C_1$-$C_{20}$ branched or unbranched alkyl or aryl group; and
m+n is defined by the valence state of the anchor provided neither m nor n are zero;
(b) aligning the surface modifying wettability agent to the subterranean formation such that the hydrophobic and/or oleophobic moiety is directed away from the surface of the formation; and
(c) forming a condensation reaction product directly or indirectly onto the surface of the formation from the one or more blocking moieties and a hydroxy group directly or indirectly attached to the subterranean formation.

Embodiment 7. The method of Embodiment 6, wherein the hydroxy group is directly attached onto the surface of the subterranean formation.

Embodiment 8. The method of Embodiment 6, wherein nanoparticles are attached onto the surface of the subterranean formation prior to pumping of the surface modifying wettability agent into the well, the surface of the nanoparticles having one or more free hydroxy groups and further wherein a condensation reaction product is formed between the one or more blocking moieties and the one or more hydroxy groups on the surface of the nanoparticles.

Embodiment 9. A method of imparting hydrophobicity and/or oleophobicity to a surface of a subterranean formation penetrated by a well during production of hydrocarbons from the subterranean formation comprising:
(a) pumping into the well hydroxy containing nanoparticles surface modified with a surface modifying wettability agent and a difunctional linking agent containing a blocking moiety, —OB, wherein B is independently selected from $C_1$-$C_{20}$ branched or unbranched alkyl or aryl group and further wherein the surface modifying wettability agent is of the structure:

$$Z_mX(OR)_n \qquad (II)$$

wherein:
X is an anchor selected from the group consisting of aluminum, silicon and a transition metal;
Z is a hydrophobic and/or oleophobic moiety attached to the anchor, the moiety comprising a substantially non-branched fluorinated monomer of a member selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether;
R is an alkyl group; and
m+n is defined by the valence state of the anchor provided neither m nor n are zero.
(b) aligning the hydroxy containing nanoparticles to the surface of the subterranean formation such that the hydrophobic and/or oleophobic moiety is directed away from the surface of the formation; and
(c) forming a condensation reaction product directly or indirectly onto the surface of the formation from the one or more blocking moieties and a hydroxy group on the surface of the formation.

Embodiment 10. The method of Embodiment 9, wherein the hydroxy group of step (c) is the hydroxy of the hydroxy containing nanoparticles.

Embodiment 11. The method of Embodiment 10, wherein B is a $C_3$-$C_9$ alkyl group or an aryl group and further wherein the one or more blocking moieties are attached to the surface of the nanoparticles by a linking group.

Embodiment 12. The method of any of Embodiments 1 to 11, wherein the hydrophobic and/or oleophobic group contains at least one terminal trifluoromethyl group.

Embodiment 13. The method of any of Embodiments 1 to 12, wherein the hydrophobic and/or oleophobic group is a $C_3$-$C_{40}$ fluorinated alkyl, fluorinated aryl group or a fluorinated ethylenically unsaturated monomer.

Embodiment 14. The method of any of Embodiments 1 to 13, wherein the anchor is Zr or Ti.

Embodiment 15. The method of any of Embodiments 3 to 5 and 8 to 14, wherein the nanoparticles are selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof.

Embodiment 16. The method of any of Embodiments 3 to 5 and 8 to 15, wherein the diameter of the substrate of the nanoparticles is less than or equal to 100 nm.

Embodiment 17. The method of any of Embodiments 8 to 16, wherein the nanoparticles are linked to the surface of the subterranean formation by a spacer or linking group.

Embodiment 18. The method of any of Embodiments 1 to 17, wherein at least a portion of a tool or pipe exposed to hydrocarbons during the production of the hydrocarbons from the subterranean formation is coated with the surface modifying wettability agent.

Embodiment 19. The method of Embodiment 18, wherein the at least a portion of the tool or pipe is coated with the surface modified nanoparticles prior to introducing the tool or pipe into the well.

Embodiment 20. A method of imparting hydrophobicity and/or oleophobicity to a surface of a subterranean formation penetrated by a well during production of hydrocarbons from the subterranean formation comprising pumping into the well a (i) difunctional linking agent having a blocking moiety, —OB, at one terminal end and a —OH, —COOH or amino group at the other terminal end; and (ii) hydroxy containing nanoparticles altered with a surface modifying wettability agent of the structure $$Z_m X(OR)_n \qquad (II)$$

wherein:

X is an anchor selected from the group consisting of aluminum, silicon and a transition metal;

Z is a hydrophobic and/or oleophobic moiety attached to the anchor, the moiety comprising the hydrophobic and/or oleophobic functional group independently selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether;

R and B are independently selected from $C_1$-$C_{20}$ branched or unbranched alkyl or aryl group; and m+n is defined by the valence state of the anchor provided neither m nor n are zero.

A condensation product is formed between the —OB of the difunctional linking agent and a free hydroxy group on the surface of the formation. A condensation product is further formed with the terminal end of the difunctional linking agent and a hydroxy group attached to the nanoparticle.

Embodiment 21. The method of any of Embodiments 1 to 20 wherein at least one of the following conditions prevail:
(a) the contact angle between the surface modifying wettability agent attached to the formation and aqueous formation fluid is greater than or equal to 105°;
(b) the surface of the subterranean formation is more rough after the surface modifying wettability agent is attached to the surface than before the surface modifying wettability agent is attached to the surface;
(c) surface tension of the surface of the subterranean formation is less after the surface modifying wettability agents are attached to the surface than before the surface modifying wettability agents are attached to the surface;
(d) the surface modifying wettability agents alter the surface energy of the formation;
(e) the surface modifying wettability agents alter the wettability of the surface of the formation to be neutrally wet
(f) the surface modifying wettability agents stabilize fines in the subterranean formation;
(g) the well is a producing well and the surface modifying wettability agents decrease the amount of formation solids flowed back from the surface of the subterranean formation into the producing well;
(h) the surface modifying wettability agents are passive anti-microbial agents and minimize or prevent the retention of water on the surface of the subterranean formation
(i) the surface modifying wettability agents passively inhibit or control scale deposition onto or within the subterranean formation;
(j) the surface modifying wettability agents passively prevent or control deposition of organic particulates onto or within the surface of the subterranean formation;
(k) the surface modifying wettability agents decrease the swelling of clay within the subterranean formation;
(l) the surface modifying wettability agents increase the relative permeability of the formation to oil/gas with respect to water, thus preventing water banking behind the formation surface;
(m) the well is a retrograde condensate gas reservoir and the surface modifying wettability agents minimize condensation within the reservoir while maintaining the permeability of the reservoir;
(n) the well is a gas or oil well and the surface modifying wettability agents enhance the amount of flowback water and produced water from the well following completion of a well treatment operation;
(o) the fluid containing the surface modifying wettability agents is pumped into the well at a pressure sufficient to create or enlarge a fracture in the subterranean formation;
(p) the surface modifying wettability agents control water condensation in the pores of the near wellbore region of the subterranean formation;
(q) the formation is a tar sand formation and the surface modifying wettability agents enhance the recovery of hydrocarbons from deposits within the tar sand;
(r) the subterranean formation is subjected to acidizing and the surface modifying wettability agents increase the penetration of acid into the formation; or
(a) the subterranean formation is a matrix formation and the surface modifying wettability agents reduce the influx of water into the formation.

What is claimed is:

1. A method of imparting hydrophobicity and/or oleophobicity to a surface of a subterranean formation penetrated by a well during production of hydrocarbons from the subterranean formation comprising:
(a) pumping into the well hydroxy containing nanoparticles surface modified with a surface modifying wettability agent and a difunctional linking agent containing a blocking moiety, —OB, wherein B is independently selected from $C_1$-$C_{20}$ branched or unbranched alkyl or aryl group and further wherein the surface modifying wettability agent is of the structure:

$$Z_m X(OR)_n$$

wherein:
X is an anchor selected from the group consisting of aluminum, silicon and a transition metal;
each Z is a hydrophobic and/or oleophobic moiety attached to the anchor, the moiety comprising a substantially non-branched fluorinated monomer of a member selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether;
each R is independently selected from a $C_1$-$C_{20}$ branched or unbranched alkyl or aryl group; and
m+n is defined by the valence state of the anchor provided neither m nor n are zero;
(b) aligning the hydroxy containing nanoparticles to the surface of the subterranean formation such that the hydrophobic and/or oleophobic moiety is directed away from the surface of the formation; and
(c) forming a condensation reaction product directly or indirectly onto the surface of the formation from the one or more blocking moieties and a hydroxy group on the surface of the formation.

2. The method of claim 1, wherein the nanoparticles are selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof.

3. The method of claim 1, wherein the hydrophobic and/or oleophobic group contains at least one terminal trifluoromethyl group.

4. The method of claim 1, wherein the hydrophobic and/or oleophobic group is a $C_3$-$C_{40}$ fluorinated alkyl, fluorinated aryl group or a fluorinated ethylenically unsaturated monomer.

5. The method of claim 1, further comprising aligning the surface modifying wettability agent to the subterranean formation such that the hydrophobic and/or oleophobic moiety is directed away from the surface of the formation.

6. The method of claim 1, wherein the nanoparticles are selected from the group consisting of tungsten oxide, iron oxide, tungsten carbide, silicon carbide, boron carbide, metal or metalloid nitrides, alkali metals, alkaline earth metals and transition metal, alumina, boehmite, zirconia and mixtures thereof.

7. The method of claim 1, wherein the nanoparticles are selected from the group consisting of fullerenes, nanotubes, graphenes like nanographite, nanodots, nanorods, nanodiamonds, polysilsesquioxanes, antimony oxide, vanadium oxide and magnesium oxide, nano-layered silicates, nano-layered nanoclays and mixtures thereof.

8. The method of claim 1, wherein the nanoparticles are derivatized with one or more functional groups selected from carboxy, epoxy, ether, ketone, amine, hydroxy, alkoxy, alkyl, aryl, aralkyl, alkaryl and lactones.

9. The method of claim 1, wherein at least one of the following conditions prevail:
(a) the contact angle between the surface modifying wettability agent attached to the formation and aqueous formation fluid is greater than or equal to 80°;
(b) the surface of the subterranean formation is more rough after the surface modifying wettability agent is attached to the surface than before the surface modifying wettability agent is attached to the surface;
(c) surface tension of the surface of the subterranean formation is less after the surface modifying wettability agents are attached to the surface than before the surface modifying wettability agents are attached to the surface;
(d) the surface modifying wettability agents alter the surface energy of the formation;
(e) the surface modifying wettability agents alter the wettability of the surface of the formation to be neutrally wet;
(f) the surface modifying wettability agents stabilize fines in the subterranean formation;
(g) the well is a producing well and the surface modifying wettability agents decrease the amount of formation solids flowed back from the surface of the subterranean formation into the producing well;
(h) the surface modifying wettability agents are passive anti-microbial agents and minimize or prevent the retention of water on the surface of the subterranean formation;
(i) the surface modifying wettability agents passively inhibit or control scale deposition onto or within the subterranean formation;
(j) the surface modifying wettability agents passively prevent or control deposition of organic particulates onto or within the surface of the subterranean formation;
(k) the surface modifying wettability agents decrease the swelling of clay within the subterranean formation;
(l) the surface modifying wettability agents increase the relative permeability of the formation to oil/gas with respect to water, thus preventing water banking behind the formation surface;
(m) the well is a retrograde condensate gas reservoir and the surface modifying wettability agents minimize condensation within the reservoir while maintaining the permeability of the reservoir;
(n) the well is a gas or oil well and the surface modifying wettability agents enhance the amount of flowback water and produced water from the well following completion of a well treatment operation;
(o) the fluid containing the surface modifying wettability agents is pumped into the well at a pressure sufficient to create or enlarge a fracture in the subterranean formation;
(p) the surface modifying wettability agents control water condensation in the pores of the near wellbore region of the subterranean formation;
(q) the formation is a tar sand formation and the surface modifying wettability agents enhance the recovery of hydrocarbons from deposits within the tar sand;
(r) the subterranean formation is subjected to acidizing and the surface modifying wettability agents increase the penetration of acid into the formation; or
(s) the subterranean formation is a matrix formation and the surface modifying wettability agents reduce the influx of water into the formation.

10. A method of imparting hydrophobicity and/or oleophobicity to a surface of a subterranean formation penetrated by a well during production of hydrocarbons from the subterranean formation comprising:
(a) pumping into the well a (i) difunctional linking agent having a blocking moiety, —OB, at one terminal end and a —OH, —COOH or amino group at the other terminal end; and (ii) hydroxy containing nanoparticles altered with a surface modifying wettability agent of the structure:

$$Z_mX(OR)_n$$

wherein:
X is an anchor selected from the group consisting of aluminum, silicon and a transition metal;
each Z is independently selected from a hydrophobic and/or oleophobic moiety attached to the anchor, the moiety comprising the hydrophobic and/or oleophobic functional group independently selected from the group consisting of a $C_3$-$C_{40}$ alkyl, $C_3$-$C_{40}$ aryl, $C_3$-$C_{40}$ fluorinated alkyl, $C_3$-$C_{40}$ fluorinated aryl, $C_3$-$C_{40}$ fluorinated ethylenically unsaturated monomer and perfluoroalkylene ether;

each R and B are independently selected from $C_1$-$C_{20}$ branched or unbranched alkyl or aryl group; and m+n is defined by the valence state of the anchor provided neither m nor n are zero;

(b) forming a condensation product between the —OB of the difunctional linking agent and a free hydroxy group on the surface of the formation; and (c) forming a condensation product with the terminal end of the difunctional linking agent and a hydroxy group attached to the surface of the formation.

11. The method of claim 10, wherein the hydrophobic and/or oleophobic group contains at least one terminal trifluoromethyl group.

12. The method of claim 10, wherein the hydrophobic and/or oleophobic group is a $C_3$-$C_{40}$ fluorinated alkyl, fluorinated aryl group or a fluorinated ethylenically unsaturated monomer.

13. The method of claim 10, wherein the nanoparticles are selected from the group consisting of silica, silicic acid, aluminum oxides, aluminum hydroxides, aluminum hydroxyoxides, aluminosilicates, zirconium oxides, zirconium hydroxides, zirconium hydroxyoxides and mixtures thereof.

14. The method of claim 10, further comprising aligning the surface modifying wettability agent to the subterranean formation such that the hydrophobic and/or oleophobic moiety is directed away from the surface of the formation.

15. The method of claim 10, wherein at least one of the following conditions prevail:

(a) the contact angle between the surface modifying wettability agent attached to the formation and aqueous formation fluid is greater than or equal to 80°;

(b) the surface of the subterranean formation is more rough after the surface modifying wettability agent is attached to the surface than before the surface modifying wettability agent is attached to the surface;

(c) surface tension of the surface of the subterranean formation is less after the surface modifying wettability agents are attached to the surface than before the surface modifying wettability agents are attached to the surface;

(d) the surface modifying wettability agents alter the surface energy of the formation;

(e) the surface modifying wettability agents alter the wettability of the surface of the formation to be neutrally wet;

(f) the surface modifying wettability agents stabilize fines in the subterranean formation;

(g) the well is a producing well and the surface modifying wettability agents decrease the amount of formation solids flowed back from the surface of the subterranean formation into the producing well;

(h) the surface modifying wettability agents are passive anti-microbial agents and minimize or prevent the retention of water on the surface of the subterranean formation;

(i) the surface modifying wettability agents passively inhibit or control scale deposition onto or within the subterranean formation;

(j) the surface modifying wettability agents passively prevent or control deposition of organic particulates onto or within the surface of the subterranean formation;

(k) the surface modifying wettability agents decrease the swelling of clay within the subterranean formation;

(l) the surface modifying wettability agents increase the relative permeability of the formation to oil/gas with respect to water, thus preventing water banking behind the formation surface;

(m) the well is a retrograde condensate gas reservoir and the surface modifying wettability agents minimize condensation within the reservoir while maintaining the permeability of the reservoir;

(n) the well is a gas or oil well and the surface modifying wettability agents enhance the amount of flowback water and produced water from the well following completion of a well treatment operation;

(o) the fluid containing the surface modifying wettability agents is pumped into the well at a pressure sufficient to create or enlarge a fracture in the subterranean formation;

(p) the surface modifying wettability agents control water condensation in the pores of the near wellbore region of the subterranean formation;

(q) the formation is a tar sand formation and the surface modifying wettability agents enhance the recovery of hydrocarbons from deposits within the tar sand;

(r) the subterranean formation is subjected to acidizing and the surface modifying wettability agents increase the penetration of acid into the formation; or (s) the subterranean formation is a matrix formation and the surface modifying wettability agents reduce the influx of water into the formation.

16. The method of claim 10, wherein the nanoparticles are selected from the group consisting of tungsten oxide, iron oxide, tungsten carbide, silicon carbide, boron carbide, metal or metalloid nitrides, alkali metals, alkaline earth metals and transition metal and mixtures thereof.

17. The method of claim 10, wherein the nanoparticles are selected from the group consisting of alumina, boehmite and zirconia.

18. The method of claim 10, wherein the nanoparticles are selected from the group consisting of fullerenes, nanotubes, graphenes like nanographite, nanodots, nanorods, nanodiamonds, polysilsesquioxanes, antimony oxide, vanadium oxide and magnesium oxide, nano-layered silicates, nano-layered nanoclays and mixtures thereof.

19. The method of claim 10, wherein the nanoparticles are derivatized with one or more functional groups selected from carboxy, epoxy, ether, ketone, amine, hydroxy, alkoxy, alkyl, aryl, aralkyl, alkaryl and lactones.

* * * * *